May 16, 1950  G. G. FREDERICHS  2,508,244
GEAR SHAPING MACHINE
Original Filed May 8, 1941

INVENTOR
GEORG GERT FREDERICHS
BY Louise O'Neil
ATTORNEY

Patented May 16, 1950

2,508,244

UNITED STATES PATENT OFFICE 2,508,244

GEAR SHAPING MACHINE

Georg Gert Frederichs, Kassel-Brasselsberg, Germany; vested in the Attorney General of the United States Original application May 8, 1941, Serial No. 392,532, now Patent No. 2,364,065, dated December 5, 1944. Divided and this application October 12, 1944, Serial No. 558,432. In Germany December 12, 1939

6 Claims. (Cl. 90—7)

My invention relates to machines for shaping gears by the conjoint relative reciprocation and rotation of the work piece and the tool, in which machines the tool is on its return stroke disengaged from the work piece. This application is a division of copending application Serial No. 392,532, filed May 8, 1941, now Patent No. 2,364,065, granted December 5, 1944.

In the known machines of the said class either the tool spindle together with the cutter and the spindle carrier or the whole work supporting table together with the work piece must be withdrawn, and by the short and rapid movements of the heavy spindle carrier or of the supporting table the machinery is subjected to violent shocks which have an unfavourable influence on the cleanliness and exactness of the work. Moreover bulky driving means are necessary for the said movements, which means are highly subjected to wear and require much power. It is especially difficult to fix the heavy supporting table at each shaping stroke.

The object of my invention is to eliminate the said drawbacks by disengaging the tool from the work piece in such a way that the cutter is moved relatively to the tool spindle, or that the tool spindle together with the cutter is moved relatively to the spindle carrier. By this arrangement it is rendered possible to use two cutting tools, of which the one performs the rough-cutting, whereas the other performs the smoothing. In this way a greater cleanliness and exactness of the toothed work and a longer duration of the cutting edges of the tools are attained.

Other objects of my invention will be apparent from the following specification referring to the drawings. According to a preferred embodiment of my invention the movement of the cutter relatively to the tool spindle is executed with hydraulic means, and an object of my invention is also the exact adjustment of the tool relatively to the work piece.

In the drawings several embodiments of my invention are shown.

Figure 1:
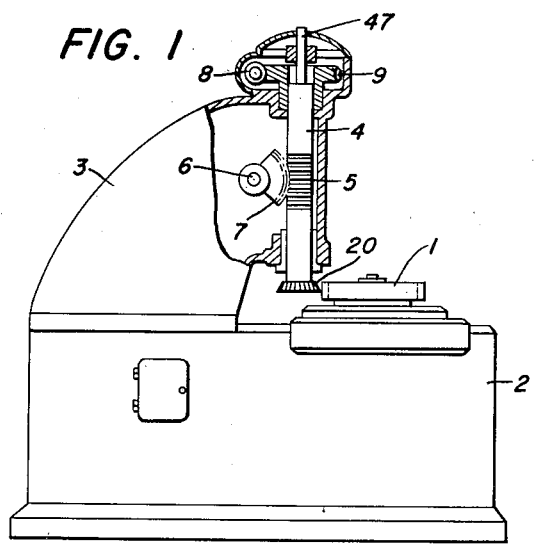
Fig. 1 is a side elevation of the gear shaping machine, partly in section.

The work piece 1 is framed on the table 2 which is rigidly connected with the spindle carrier 3 in which the tool spindle 4 is guided in vertical and axial direction. The tool spindle has several annular rack-teeth meshing with a toothed sector 7 which is rotatable about the axis 6. By a rotation of the said sector the tool spindle is forced upwards or downwards in a vertical direction. Simultaneously the work piece 1 as well as the tool spindle 4 is rotated. The rotation of the tool spindle is executed by means of the worm 8 and the worm wheel 9. The cutter 20 is articulated to the tool spindle 4.

Figure 2:
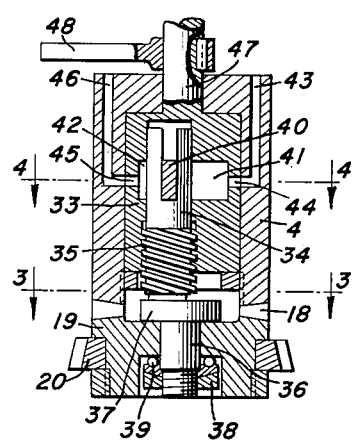
Fig. 2 is a section through a portion of the tool spindle according to which the cutter is displaced by an eccentric bolt.
Figure 3:
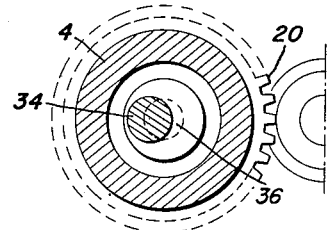
Fig. 3 is a section through the tool spindle according to the line 3—3 of Fig. 2.
Figure 4:
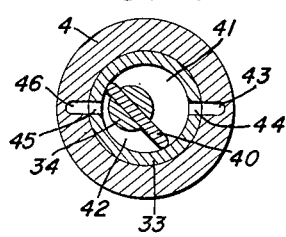
Fig. 4 is a section according to the line 4—4 of Fig. 2.

According to the modification shown in Figs. 2, 3 and 4, the tool retains its horizontal position during its movements relatively to the tool spindle. The tool spindle 4 has a spur cogging 18 which is engaged by a corresponding counter-cogging of the disc 19 for the cutter 20. Inside of the spindle 4 a cylinder 33 is rotatable. The said cylinder has an eccentric bore in which a bolt 34 is rotatable and axially displaceable. The said bolt 34 is threaded at 35 and has an eccentrically arranged cylindrical stud 36 which is concentric to the spindle 4 and which engages with a concentric bore of the disc 19. The disc is held on the stud at one end of the same by the annular shoulder 37 and at the other end by a nut 38 which engages the disc through the intermediary of a ball bearing 39.

The upper end of the bolt 34 has a slot in which a slide member 40 is inserted the end faces of which are adjacent the walls of a cylindrical chamber 41, 42 in the socket 33. The member 40 forms a hydraulic rotatable piston which imparts rotation to the bolt 34. Through the slide member the cylindrical chamber is divided into the parts 41 and 42.

The channels 43, 44, 45 and 46 form the inlets to the pressure chambers 41, 42.

The cylinder 33 has a central pivot 47 which protrudes through a corresponding bore of the tool spindle 4 to the outside. To the said pivot, a lever 48 is keyed which holds the cylinder during the operation in such a way that the tool spindle 4 rotates about the cylinder. In this way the device for radially displacing the cutter remains immovable.

The operation is as follows: The pressure liquid enters the chamber 42 and turns the slide-member 40 and with it the bolt 34. Through the intermediary of the threads 35 the bolt 34 is screwed downwards. Simultaneously the eccentric stud 36 oscillates about the axis of the bolt 34, and in consequence thereof the disc 19 together with the cutter 20 is cleared away from the cogging 18 of the tool spindle 4. But simultaneously the cutter is also cleared away in radial direction from the work piece 1, so that the return stroke of the tool can take place unimpeded by the work piece.

Now the pressure liquid is fed through the channels 43, 44 to the chamber 41. The slide member 40 and the bolt 34 are now rotated in the opposite direction. In consequence thereof the bolt 34 moves upwards, and the disc 19 is brought into engagement with the spur-cogging 18 of the tool spindle 4. The cutter 20 is now in position to execute the next following working stroke.

Figure 5:
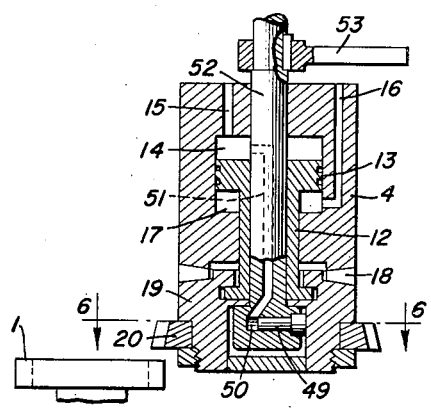
Fig. 5 shows an embodiment according to which the cutter is moved relatively to the tool spindle both in the axial and radial direction by means of hydraulically actuated pistons.
Figure 6:
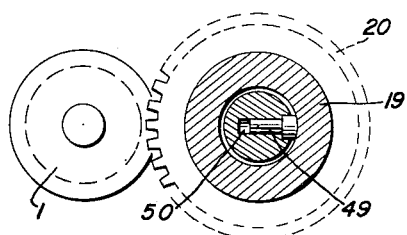
Fig. 6 is a section according to the line 6—6 of Fig. 5.

The Figs. 5 and 6 show a construction wherein the pressure liquid influences a piston 13 which axially displaces the bolt 12. This bolt does not engender a tilting movement of the cutter 20 but displaces the same in the axial direction parallel to itself. The radial displacement of the cutter is here engendered by the piston 49 which is guided in the bore 50 into which the pressure liquid is fed through the channel 51. The channel 51, the bore 50 and the piston 49 are provided in the bolt 52 which is centrically and rotatably mounted in the bolt 12.

The operation is as follows: The pressure liquid is fed to the chamber 14 through the channel 15. The piston together with the bolt 12, the disc 19 and the cutter 20 moves downwards. Simultaneously the pressure liquid is pressed through the channel 51 into the chamber 50. The disc and the cutter which are clear from the cogging are now radially moved away from the work piece 1 by the piston 49. Now also the tool spindle 4 moves upwards. In the uppermost position of the spindle the pressure liquid is fed to the chamber 17 through the channel 16. The piston 13 and the cutter move upwards, and the disc is again brought into engagement with the cogging 18 in such a way that the disc is centrically adjusted relatively to the axis of the tool spindle. Thereby the piston 49 also returns into its initial position. The cutter is now in the position to execute another working stroke.

What I claim and desire to secure by Letters Patent is:

1. A gear shaping machine comprising a tool spindle, a gear shaper cutter held by the said spindle, a table carrying the gear blank, means for engendering a conjoint relative reciprocation and rotation of the gear blank and the cutter, a cylindrical stud about which the cutter is rotatable and a threaded bolt eccentrically and rigidly connected with the said stud and eccentrically guided in the tool spindle.

2. A gear shaping machine comprising a tool spindle, a gear shaper cutter held by the said spindle, a table carrying the gear blank, means for engendering a conjoint relative reciprocation and rotation of the gear blank and the cutter, a cylindrical stud about which the cutter is rotatable, a threaded and slotted bolt eccentrically and rigidly connected with the said stud and eccentrically guided in the tool spindle and a slide member engaging the slot of the bolt and forming a rotatable hydraulic piston for imparting rotary motion to the bolt.

3. A gear shaping machine comprising a tool spindle, a gear shaper cutter held by the said spindle, a table carrying the gear blank, means for engendering a conjoint relative reciprocation and rotation of the gear blank and the cutter, a cylindrical stud about which the cutter is rotatable, a threaded and slotted bolt eccentrically and rigidly connected with the said stud and eccentrically guided in the tool spindle, a slide member engaging the slot of the bolt and forming a rotatable hydraulic piston for imparting rotary motion to the bolt, a socket guiding the bolt and rotatably mounted in the tool spindle, and a lever for rotating the socket.

4. A gear shaping machine comprising a tool spindle having a spur cogging, a gear shaper cutter having also a spur cogging engaging the spur cogging of the spindle during the working, means for engendering a conjoint relative reciprocation and rotation of the gear blank and the cutter and means for displacing the cutter relatively to the axis of the spindle at the return stroke of the cutter, such displacing means consisting of a hydraulic member for clearing the cutter away from the tool spindle and of a hydraulic member for subsequently displacing the cutter relatively to the axis of the tool spindle.

5. In a shaping machine for forming teeth upon a work piece, the combination of an elongated spindle member rotatably mounted upon said cylindrical member, a circular gear cutter member substantially axially aligned with said spindle member, said two last-named members having interengageable coggings on their proximate faces, means radially movable with respect to the cylindrical member and engageable with the cutter member, and hydraulic means for operating said radially movable means to effect displacement of the cutter member radially of the cylindrical member.

6. A gear shaping machine according to claim 5 wherein said hydraulic means comprises fluid conduits formed respectively in the cylindrical and spindle members and communicating one with another.

GEORG GERT FREDERICHS.

REFERENCES CITED

The following references are of record in the file of this patent:

UNITED STATES PATENTS

| Number | Name | Date |
| --- | --- | --- |
| 2,055,132 | McLeod | Sept. 22, 1936 |
| 2,364,065 | Frederichs | Dec. 5, 1944 |

FOREIGN PATENTS

| Number | Country | Date |
| --- | --- | --- |
| 432,475 | Great Britain | July 26, 1935 |